US011890613B2

(12) United States Patent
Boitard et al.

(10) Patent No.: US 11,890,613 B2
(45) Date of Patent: Feb. 6, 2024

(54) DROP RECOVERY SYSTEM AND ASSOCIATED METHOD

(71) Applicant: MilliDrop Instruments SAS, St Mande (FR)

(72) Inventors: Laurent Boitard, Paris (FR); Jairo Garnica Rodriguez, Massy (FR)

(73) Assignee: GOLD STANDARD DIAGNOSTICS MILLIDROP, Nantes (FR)

( * ) Notice: Subject to any disclaimer, the term of this patent is extended or adjusted under 35 U.S.C. 154(b) by 494 days.

(21) Appl. No.: 16/476,436

(22) PCT Filed: Jan. 4, 2018

(86) PCT No.: PCT/EP2018/050186
§ 371 (c)(1),
(2) Date: Jul. 8, 2019

(87) PCT Pub. No.: WO2018/127530
PCT Pub. Date: Jul. 12, 2018

(65) Prior Publication Data
US 2020/0055040 A1 Feb. 20, 2020

(30) Foreign Application Priority Data
Jan. 9, 2017 (FR) ....................................... 1750181

(51) Int. Cl.
*B01L 3/02* (2006.01)
*B01L 3/00* (2006.01)

(52) U.S. Cl.
CPC ....... *B01L 3/0241* (2013.01); *B01L 3/502784* (2013.01); *B01L 2200/025* (2013.01);
(Continued)

(58) Field of Classification Search
CPC ............ B01L 3/0241; B01L 3/502784; B01L 2200/0673; B01L 3/502769; B01L 3/502776
See application file for complete search history.

(56) References Cited

U.S. PATENT DOCUMENTS

2002/0058332 A1* 5/2002 Quake ...................... C12M 1/34 204/601
2005/0029442 A1* 2/2005 Takats .................. H01J 49/167 250/281

(Continued)

FOREIGN PATENT DOCUMENTS

EP 2436444 A1 4/2012
FR 2907030 A1 4/2008
WO 2015195698 A1 12/2015

OTHER PUBLICATIONS

International Search Report for PCT/EP2018/050186 dated Feb. 2, 2018.

(Continued)

*Primary Examiner* — Jill A Warden
*Assistant Examiner* — Dwayne K Handy
(74) *Attorney, Agent, or Firm* — Pearne & Gordon LLP

(57) ABSTRACT

The present invention relates to a recovery system for drops comprising: a conduit for the circulation of a working fluid comprising a plurality of pockets that are isolated by separators, a recovery substrate comprising multiple compartments, a displacement device that is able to successively position the outlet of the conduit opposite at least two different compartments, a preparation device that is able to inject, into the conduit, an additional volume of separator fluid and an additional volume of carrier fluid, such that the volume of at least one separator is greater than or equal to a critical separation volume, and that the volume of at least
(Continued)

one bubble formed by a pocket and a part of the separator is greater than or equal to a critical detachment volume.

14 Claims, 4 Drawing Sheets

(52) U.S. Cl.
CPC .................. *B01L 2200/0673* (2013.01); *B01L 2300/0819* (2013.01); *B01L 2300/0829* (2013.01)

(56) References Cited

U.S. PATENT DOCUMENTS

| | | | | |
|---|---|---|---|---|
| 2008/0124726 | A1* | 5/2008 | Monforte ............... | G01N 35/08 435/6.12 |
| 2011/0053798 | A1 | 3/2011 | Hindson et al. | |
| 2012/0108721 | A1 | 5/2012 | Mazutis | |
| 2013/0236901 | A1* | 9/2013 | Potier .................. | C12Q 1/6806 435/6.12 |
| 2015/0209785 | A1 | 7/2015 | Esmail et al. | |

OTHER PUBLICATIONS

Search Report for French Application No. FR 17 50181 dated Sep. 29, 2017.

Jialan Cao et al., "From microtiter plates to droplets" tools for micro-fluidic droplet processing, Microsyst Technol, Springer-Verlag Berlin Heidelberg 2013, Published online Dec. 1, 2013, pp. 1-10, DOI 10.1007/S00542-013-1981-y.

* cited by examiner

DROP RECOVERY SYSTEM AND ASSOCIATED METHOD

CROSS-REFERENCE TO RELATED APPLICATIONS

This is the National Stage of PCT international application PCT/EP2018/050186, filed on Jan. 4, 2018, which claims the priority of French Patent Application No. 17 50181, filed Jan. 9, 2017, both of which are incorporated herein by reference in their entirety.

The present invention relates to a drop recovery system comprising:

- a conduit for the circulation of a working fluid, the circulation conduit comprising an outlet,
- a device for circulating a working fluid in the circulation conduit, the working fluid comprising a plurality of pockets, each pocket comprising a carrier fluid and a pocket containing a drop of internal fluid, the internal fluid being immiscible with the carrier fluid, each pocket being isolated from the following pocket by a separator, each separator being made up of a separator fluid that is immiscible with the carrier fluid,
- a recovery substrate of the pockets of the working fluid, the recovery substrate including several compartments, a compartment being placed opposite the outlet of the circulation conduit,
- a relative displacement device of the substrate with respect to the circulation conduit, the displacement device being able to successively place the outlet of the conduit opposite at least two different compartments of the substrate.

Such a system is for example used to recover drops so as to isolate them, one by one, on a substrate.

Drop fluidics is used in a large number of laboratories to miniaturize biological or biochemical reactions in bioreactors comprising less than a milliliter. Sampling speeds, beyond a thousand drops analyzed per second and the reduction of sample sizes, make drop technology very attractive, for example, for molecule or cell screening.

It is important in some applications to be able to recover isolated drops on a macroscopic substrate. The substrate is for example a plate with 96, 384 or 1536 wells or a petri dish or a MALDI dish. For example, in the field of high-speed cell analysis, it is desirable to test many isolated cells at once, then to select and recover the most interesting cells, while minimizing the risk of contamination. Isolating cells in separate drops facilitates the tests, then culturing the selected cells makes it possible to obtain clones generating monoclonal antibodies or industrial enzymes.

Systems exist for which the drops must incubate for a certain time, for example, bacteriological analysis systems.

Furthermore, in the existing methods, the recovery of the drops and their distribution in the recovery substrate is difficult. For example, the drops or the pockets tend to adhere to the outlet of the circulation conduit and not to be ejected toward a desired compartment of the substrate. Furthermore, when a drop adheres to the outlet of the circulation conduit, it risks merging with the following drop toward a compartment of the substrate. Such phenomena increase the risks of contamination between drops and the risk of losing an interesting drop without being able to recover it.

The article "“From microtiter plates to droplets” tools for microfluidic droplets processing", by Cao et al. published online, Dec. 1, 2013, in the review *Microsystem Technologies*, describes a tube comprising a biphasic fluid comprising aqueous drops in oil. To prevent contamination due to the partial adherence of the drops to the outlet of the tube, Cao et al. considers pre-filling the wells of the micro-titration plates used to recover the drops with a solvent.

However, such a solution requires the outlet of the circulation conduit to be submerged in the wells, one by one, for distribution. The risks of contamination, during distribution, in such a system therefore remain significant. Furthermore, the implementation is made difficult by the large quantity of fluid, in particular in the recovery plate, if the spacing between the drops is large.

One aim of the invention is to provide a more reliable and precise drop recovery system than the existing systems, allowing an effective recovery of each drop and making it possible to limit the contamination risks.

To that end, the invention relates to a system of the aforementioned type, characterized in that the recovery system further comprises a preparation device for the distribution of the pockets, able to inject, into the circulation conduit, an additional volume of separator fluid, and able to inject, into the circulation conduit, an additional volume of carrier fluid, such that the volume of at least one separator is greater than or equal to a critical separation volume, and such that the volume of at least one bubble formed by a pocket and at least a part of said separator is greater than or equal to a critical detachment volume.

The system according to the invention may comprise one or more of the following features, considered alone or according to any technically possible combination:

- the drop recovery system comprises:
  - a tube defining a part of the circulation conduit for the working fluid, the tube emerging on a mouth open at the outlet of the circulation conduit, the tube comprising an outer wall;
  - a nozzle having a through passage, the tube being placed in the through passage of the nozzle;
  - a blower unit able to inject a flow of air into the through passage such that a part of the air runs along the outer wall of the tube up to the mouth of the tube;
- the blower unit is able to inject a continuous flow of air into the through passage;
- the tube and the nozzle have a same axis of symmetry and the tube is centered relative to the nozzle;
- the inner passage has a polygonal shape, the outer wall of the tube being fitted in the polygon;
- the drop recovery system comprises a control unit able to control the quantity of separator fluid and/or carrier fluid injected into the circulation conduit by the preparation device for the distribution of the pockets;
- the circulation conduit has a wider area, the preparation device for the distribution of the pockets being able to inject the additional volume of separator fluid into the wider area;
- the circulation conduit has an injection area for the carrier fluid and an injection area for the separator fluid located downstream from the injection area for the carrier fluid;
- the separator fluid is a gas;
- the preparation device for the distribution of the pockets is able to inject, into the circulation conduit, an additional volume of carrier fluid, such that the volume of at least one pocket is strictly less than a critical fragmentation volume;
- the pockets are isolated from one another by a plurality of separators, each separator being isolated from the following separator by a carrier fluid pocket.

The invention also relates to a drop recovery method comprising the following steps:

circulating a working fluid in a circulation conduit comprising an outlet, the working fluid comprising a plurality of pockets, each pocket comprising a carrier fluid and a pocket containing a drop of internal fluid, the internal fluid being immiscible with the carrier fluid, each pocket being isolated from the following pocket by a separator, each separator being made up of a separator fluid that is immiscible with the carrier fluid, recovering at least one pocket, in at least one compartment of a recovery substrate including several compartments, said compartment being placed opposite the outlet of the circulation conduit, the relative displacement of the substrate with respect to the circulation conduit, so as to successively place the outlet of the conduit opposite at least two different compartments of the substrate, characterized in that the method further comprises:

the preparation of the distribution of the pockets comprising:

the injection into the circulation conduit of an additional volume of separator fluid, and the injection into the circulation conduit of an additional volume of carrier fluid, the preparation of the distribution of the pockets being such that the volume of at least one separator is greater than or equal to a critical separation volume and the volume of at least one bubble formed by a pocket and a part of said separator is greater than or equal to a critical detachment volume.

The drop recovery method according to the invention may comprise one or more of the following features, considered alone or according to any technically possible combination:

the conduit is defined by a wall and the recovery comprises:

the discharge at the outlet of the circulation conduit of a pocket and part of the separator, said pocket and said part of the separator forming a bubble having a volume greater than or equal to the critical detachment volume, the pocket detaching from the wall of the circulation conduit, and moving into the compartment of the substrate located opposite the outlet;

the drop recovery method comprises:

the discharge through the outlet of the circulation conduit of a separator having a volume greater than or equal to the critical separation volume, during the movement of the substrate relative to the distribution conduit between a first compartment and a second compartment, such that the pocket following the separator arrives at the outlet of the circulation conduit, when the outlet of the conduit is opposite the second compartment;

the circulation conduit is substantially vertical at the outlet;

the separation volume is determined as a function of the movement speed of the displacement device, the distance between two different compartments of the substrate and the flow rate of the working fluid in the circulation conduit.

The invention will be better understood upon reading the following description, provided solely as an example, and in reference to the appended drawings, in which.

In the following description, the terms "upstream" and "downstream" and the terms "inlet" and "outlet" are used in reference to the normal circulation directions of the fluids of the system.

The term "longitudinal" is defined relative to the direction of the circulation conduit. "Transverse plane" refers to the planes that are perpendicular to the longitudinal direction.

The term "diameter of the conduit" refers to the maximum expanse of the conduit in a transverse plane.

The term "diameter" for a pocket, separator or drop refers to the maximum expanse of the element in question.

A first drop recovery system 1 is shown in FIGS. 1 to 7.

The first drop recovery system 1 is provided to recover drops 4 of a working fluid 6 separately.

Figure 1:
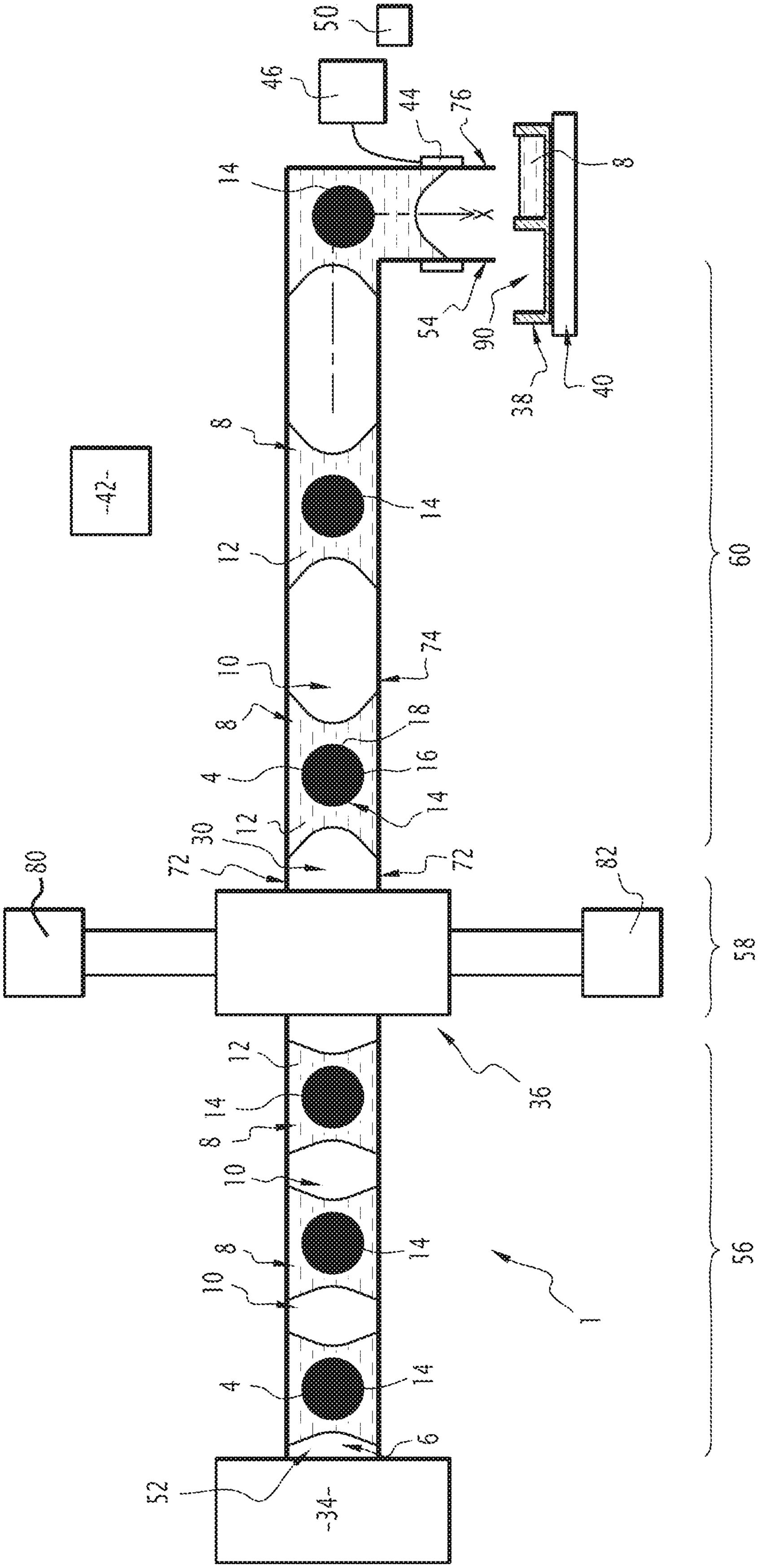
FIG. 1 is a schematic illustration of a first drop recovery system according to the invention.

The working fluid 6 is shown in FIG. 1.

The working fluid 6 comprises a plurality of pockets 8 isolated from one another by a plurality of separators 10.

The working fluid 6 is for example a tri-phasic fluid. In a variant, the working fluid 6 comprises more than three phases.

Each pocket 8 comprises a carrier fluid 12 and advantageously comprises a drop 4 of internal fluid 14. At least one pocket 8 comprises a drop 4.

The carrier fluid 12 is the same in each of the pockets 8 of the working fluid 6. The carrier fluid 12 is advantageously an organic phase, in particular an oily phase.

The carrier fluid 12 for example comprises hydrofluoroethers such as FC-40 or HFE-7500, forming a fluorinated oil. In a variant, the carrier fluid 12 comprises a silicone oil.

Each drop 4 constitutes a closed compartment filled with internal fluid 14.

The volume of drops 4 of the working fluid 6 is for example between 100 nL and 2 μL.

In one example, the volume of drops 4 is substantially the same from one drop to the next.

Each drop 4 is in a pocket 8. Advantageously, each drop 4 is in a different pocket 8.

The internal fluid 14 of each drop 4 is immiscible with the carrier fluid 12. Immiscible means that the distribution coefficient between the two fluids is less than 10-3.

The internal fluid 14 is advantageously an aqueous phase.

The internal fluid 14 of each drop 4 is potentially different from one drop 4 to the next 4. Advantageously, the internal fluid 14 of all of the drops 4 comprises at least one same common base 16.

For example, the common base 16 is a buffer solution suitable for the survival of bacteria, such as a phosphate-buffered saline solution or a culture medium.

The internal fluid 14 of each drop 4 is made up of elements 18 specific to the drop 4 and the common base 16. The proportions of the specific elements 18 and the common base 16 and/or the natures of the specific elements 18 vary from one drop 4 to the next.

For example, the specific elements 18 of a drop 4 are a cell and elements secreted by the cell, such as proteins.

Each separator 10 is made up of a separator fluid 20. The separator fluid 20 is immiscible with the carrier fluid 12.

The separator fluid 20 is advantageously a gaseous phase. The separator fluid is for example air.

The separator fluid 20 is the same in each of the separators 10.

The first drop recovery system 1, shown in FIGS. 1 to 7, comprises a circulation conduit 30 for the working fluid 6, a circulation device 34 for the working fluid 6 and the circulation conduit 30, a preparation device 36 for the distribution of the pockets 8, a recovery substrate 38 for the pockets 8 and a relative displacement device 40 for the substrate 38 with respect to the circulation conduit 30, and a control unit 42. Furthermore, the first recovery system 1 advantageously comprises a nozzle 44 and a blower unit 46.

Figure 2:
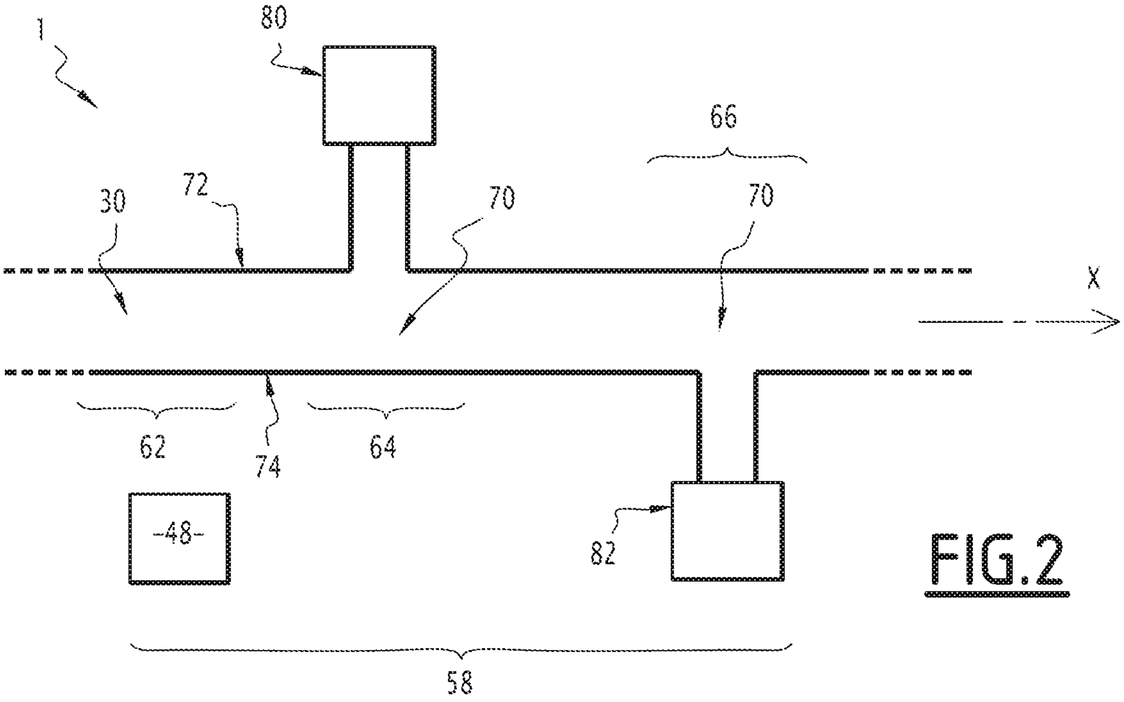
FIG. 2 is a detailed illustration of part of the recovery system.
Figure 3:
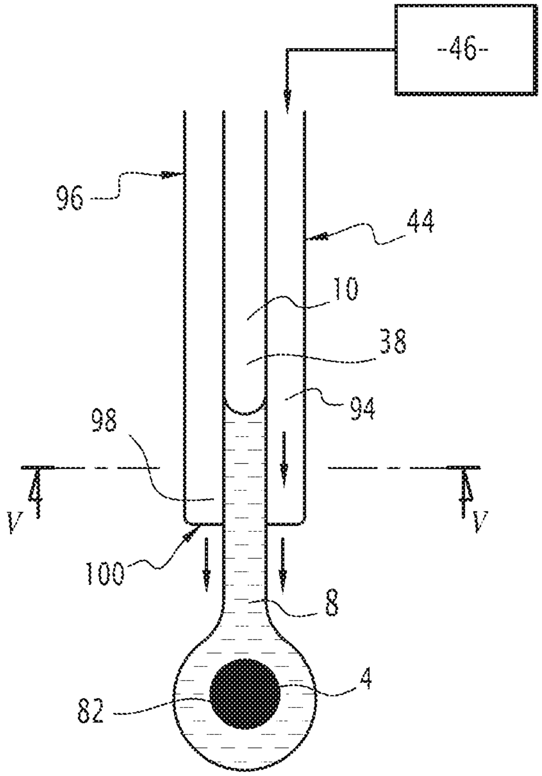
FIG. 3 is a detailed illustration of another part of the recovery system.

Additionally, as shown in FIG. 2, the first recovery system 1 advantageously comprises a sensor 48. Advantageously, the first recovery system 1 comprises an outlet detector 50, as illustrated in FIG. 1.

The circulation conduit comprises an inlet 52 and an outlet 54. The circulation conduit 30 is elongated between its inlet 52 and its outlet 54 along a longitudinal direction X.

The circulation conduit 30 successively defines, in the circulation direction of the working fluid 6, an inlet zone 56, a preparation zone 58 and an outlet zone 60.

The inlet 52 and the outlet 54 are two ends of the circulation conduit 30.

The inlet 52 is connected to the circulation device 34 for the working fluid 6.

The outlet 54 of the conduit 30 is able to be placed opposite a compartment 90 of the recovery substrate 38.

The inlet area 56 extends from the inlet 52 to the preparation area 58. The preparation area 58 extends from the inlet area 56 to the outlet area 60.

The preparation area 58 is shown in detail in FIG. 2.

The preparation area 58 comprises a measuring region 62, a carrier fluid injection area 64 and a separator fluid injection area 66.

The measuring region 62 is located upstream from the carrier fluid injection area 64 and the separator fluid injection area 66.

Preferably, the carrier fluid injection area 64 is located upstream from the separator fluid injection area 66.

In a variant, the carrier fluid injection area 64 is located downstream from the separator fluid injection area 66 or at the same level as the separator fluid injection area 66.

In this example, in the carrier fluid injection area 64, the circulation conduit 30 has a junction 68 with a carrier fluid injection conduit 12 of the preparation device 36.

In the separator fluid injection area, the circulation conduit 30 has a junction 70 with a separator fluid injection conduit 20 of the preparation device 36.

In the illustrated example, the junctions 68, 70 are T junctions, i.e., the lateral conduit extends perpendicular to the longitudinal direction X. In a variant, the junctions 68, 70 have a Y or other geometry.

The outlet zone 60 extends from the preparation zone 58 to the outlet 54 of the circulation conduit 30.

In the outlet zone 60, the circulation conduit 30 is substantially vertical. This means that the longitudinal direction X of the circulation conduit 30 extends substantially vertically at the outlet. "Substantially vertical" means that the direction forms an angle of less than or equal to 5° relative to the vertical and is preferably vertical.

The circulation conduit 30 for the working fluid 6 is delimited by a wall 72.

For example, the length of the circulation conduit 30 measured along the longitudinal axis X between the inlet 52 and the outlet 54 is between 50 cm and 10 m.

For example, the diameter of the circulation conduit 30 is between 25 μm and 2 mm, and advantageously between 500 μm and 1 mm.

In one example, the diameter of the circulation conduit is equal to 750 μm.

Advantageously, the circulation conduit 30 has a substantially constant diameter along the longitudinal axis X.

For example, the cross-section of the circulation conduit 30 is circular. "Cross-section" refers to a section in a plane transverse to the longitudinal axis X.

In a variant, the cross-section of the circulation conduit 30 has other shapes. For example, the cross-section of the circulation conduit 30 is rectangular.

In the first recovery system 1, the circulation conduit 30 is the inner aperture of a tube 74. The tube 74 comprises the wall 72 delimiting the circulation conduit 30. The tube 74 further comprises an outer wall 75.

The material of the tube 74 is impermeable to the carrier fluid 12. Furthermore, the material of the tube 74 is advantageously impermeable to the separator fluid 20, in particular when the separator fluid 20 is a liquid.

Advantageously, the tube 74 is made from a material having an affinity with the carrier fluid 12 such that the contact angle formed by the carrier fluid 12 on the tube 74 is less than 10°.

Advantageously, the tube 74 is made from a material having an affinity with the internal fluid 14 such that the contact angle formed by the internal fluid 14 on the tube 74 is less than 122°.

For example, the tube 74 comprises polytetrafluoroethylene (PTFE).

The tube 74 emerges on an open mouth 76 at the outlet 54 of the circulation conduit 30.

The inner diameter of the tube 74 is the diameter of the circulation conduit 30.

For example, the inner diameter of the tube 74 is between 50 μm and 1 mm. The inner diameter of the tube 74 is advantageously less than or equal to 1 mm.

The outer diameter of the tube 74 is for example between 0.5 mm and 4 mm.

The circulation device 34 is able to store, inject the working fluid 6 in the inlet area 56 of the circulation conduit 30, and to circulate it along the conduit 30. In the circulation conduit 30, each pocket 8 is isolated from the following pocket 8 via separator 10.

In the circulation conduit 30, each separator 10 is isolated from the following separator 10 by a pocket 8.

For example, the diameter of a drop 4 is greater than or equal to the inner diameter of the circulation conduit 30. This means that the drop 4 is confined by the wall 72 of the circulation conduit 30. Even when the drop 4 is confined, a film of carrier fluid 12 belonging to the pocket 8 exists between the wall 72 of the circulation conduit 30 and the drop 4. Advantageously, the film of carrier fluid 12 extends between the wall 72 of the circulation conduit 30 and the drop 4, and between each separator 10 adjacent to the pocket 8 and the drop 4.

The volume of a pocket 8 is equal to the sum of the volume of the drop 4 and the volume of carrier fluid 12 that it contains.

In one example, the volume of the drop 4 is between 200 nL and 300 nL and the volume of carrier fluid 12 in a pocket 8 in the inlet zone 56 is for example between 50 nL and 150 nL. Thus, the pocket 8 contains a drop 4 covered by a film of carrier fluid 12 having a small volume relative to the volume of the drop 4.

The diameter of each pocket 8 is greater than or equal to that of the circulation conduit 30. This means that the pocket 8 is confined by the wall 72 of the circulation conduit 30.

The volume of a separator 10 in the inlet area 56 is for example between 300 nL and 800 nL. The diameter of each separator 10 is greater than or equal to that of the circulation conduit 30. This means that the separator 10 is confined by the wall 72 of the circulation conduit 30.

Figure 4:
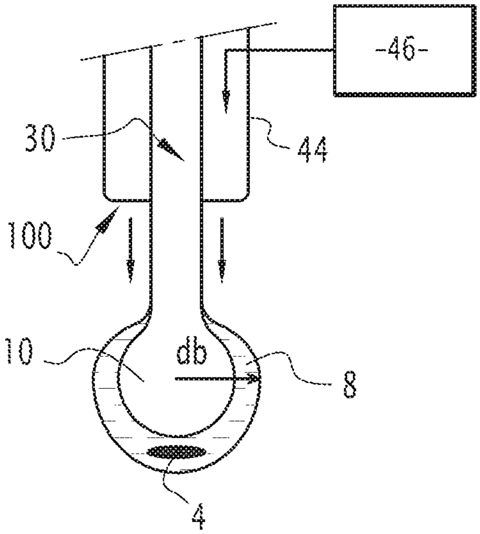
FIG. 4 is a detailed illustration of part of the recovery system.

At the outlet 54, as shown in FIG. 4, during the expulsion from the pocket 8, a pocket 8 forms the outer film of a bubble, as shown in FIG. 4.

The bubble is filled with a volume of separator fluid 20 separated from the outside air by the pocket 8 forming a film. The bubble has a substantially spherical shape. The bubble is attached to the mouth 76 of the tube 74.

The circulation device 34 is able to circulate the pockets 8 and the separators 10 in the circulation conduit 30 downstream from the inlet area 56 toward the outlet 54.

For example, the circulation device 34 includes a reservoir filled with working fluid 6, a device able to pressurize the reservoir and a connection hose to the inlet zone.

In a variant, the circulation device 34 includes syringe pump, a syringe filled with working fluid 6 and a connection hose to the inlet zone. For example, the working fluid 6 is prepared using a device for generating working fluid and kept before being used in the first recovery system 1. In a variant, the circulation device 34 comprises a device for generating working fluid 6.

The preparation device 36 for the distribution of the pockets 8 is able to inject, into the circulation conduit 30, an additional volume of separator fluid 20, and able to inject, into the circulation conduit 30, an additional volume of carrier fluid 12, such that the volume of at least one separator 10 is greater than or equal to a critical separation volume, and such that the volume of at least one bubble formed by a pocket 8 and at least a part of said separator 10 is greater than or equal to a critical detachment volume Vd.

Advantageously, the preparation device 36 for the distribution of the pockets 8 is further able to inject, into the circulation conduit 30, an additional volume of carrier fluid 12, such that the volume of at least one pocket 8 is strictly less than a critical fragmentation volume Vf.

The distribution preparation device 36 comprises a carrier fluid injection device 80 and a separator fluid injection device 82.

The carrier fluid injection device 80 is able to inject carrier fluid 12 into the circulation conduit 30, in particular into the carrier fluid injection area 64.

The carrier fluid injection device 80 for example includes a container in which a volume of carrier fluid 12 is placed. The carrier fluid injection device 80 further includes a hose for connecting the container to the circulation conduit 30. The connection hose defines an injection conduit. The injection conduit emerges in the carrier fluid injection area 64 at the junction 68. The carrier fluid injection device 80 further comprises a device for circulating the carrier fluid.

For example, the carrier fluid injection device 80 includes a syringe plunger, a syringe filled with carrier fluid oil 12 and a connection nozzle.

The injection device for the carrier fluid 80 can be controlled by the control unit 42.

The separator fluid injection device 82 is able to inject separator fluid 20 into the circulation conduit 30, in particular into the separator fluid injection area 66.

The separator fluid injection device 82 for example includes a container in which a volume of separator fluid 20 is placed. The separator fluid injection device 82 further includes a hose for connecting the container to the circulation conduit 30. The connection hose defines an injection conduit. The injection conduit emerges in the separator fluid injection area 64 at the junction 68. The separator fluid injection device 82 further comprises a device for circulating the separator fluid.

For example, the separator fluid injection device 82 includes a syringe plunger, a syringe filled with separator fluid oil 20 and a connection nozzle.

The injection device for the separator fluid 82 can be controlled by the control unit 42.

The volume of each pocket 8 in the outlet area 60, after the passage in the preparation area 58, is for example the same.

The volume of each separator 10 in the outlet area 60, after the passage in the preparation area 58, is for example the same.

The volume of each separator 10 in the outlet area 60, after the passage in the preparation area 58, is for example greater than three times the volume of a separator 10 in the inlet area 56.

In one example, the separator fluid injection device 82 is able to inject separator fluid 20 into the circulation conduit 30 with continuous flow.

The substrate 38 includes several compartments 90.

For example, the substrate is a petri dish having a large enough surface to receive several pockets. In these cases, the compartments 90 are for example delimited by a grid.

Each compartment 90 is able to receive at least one pocket.

The diameter of each compartment 90 is strictly larger than the diameter of the circulation conduit 30 in the outlet zone 60.

Advantageously, the substrate 38 includes several compartments 90 that are isolated from one another.

For example, the substrate 38 is a plate with ninety-six wells, each well being a separate recovery compartment 90.

In one example, each compartment 90 of the substrate 38 comprises a liquid. Advantageously, the volume of liquid in the compartment is such that the outlet 54 of the circulation conduit 30 is not in contact with the liquid.

In a variant, the substrate 38 is a plate with eighty wells, with three hundred eighty-four wells, with one thousand five hundred thirty-six wells.

In a variant, the substrate 38 is a plate used for a matrix-assisted laser desorption ionization (MALDI) analysis.

The displacement device 40 is able to move the substrate relative to the tube 74 and the circulation conduit 30.

For example, the displacement device 40 is able to move the substrate horizontally at a speed of between 0.5 mm/s and 100 mm/s. In one example, the displacement device 40 is a robotic platen.

In a variant, the displacement device 40 is able to move the outlet 54 horizontally at a speed of between 0.5 mm/s and 100 mm/s. Advantageously, the displacement device 40 is further able to move the outlet 54 vertically. For example, the displacement device 40 is an arm able to move the tube 74.

The control unit 42 for example comprises a computer and a memory. Furthermore, the control unit 42 advantageously comprises a man-machine interface.

The control unit 42 is able to control the circulation device 34, the preparation device 36 and the displacement device 40.

Furthermore, the control unit 42 is able to receive the signals from the sensor 48 and the outlet detector 50 and to record characteristics of the pockets 8, drops 4 and separators 10.

The control unit 42 advantageously has at least one critical fragmentation volume in memory.

The critical fragmentation volume is adapted to the system so that 100% of the pockets 8 have a volume smaller than the critical fragmentation volume, do not fragment before they are expelled at the outlet 54.

A pocket 8 is said to fragment at the outlet 54 if part of the pocket 8 remains attached to the tube 74 but another part of the pocket 8 is expelled or if the pocket 8 expelled at the outlet is not fully recovered in a single compartment 90 of the substrate 38.

The critical fragmentation volume for example has been determined beforehand for a first recovery system 1 with the same carrier fluid 12, by performing calibration experiments.

A calibration example making it possible to determine the critical fragmentation volume will now be described.

The experiment is done for a calibration fluid comprising carrier fluid 12 and liquid drops 4 having a strong adhesion to the PTFE tube 74. In this experiment, the calibration fluid does not comprise separators 10.

The circulation flow rates of the calibration fluid and the air flow are kept constant.

Then, the volume of carrier fluid 12 between the drops 4 is adjusted to measure 1 time to 1.5 times the volume of a drop 4.

At the outlet, pockets 8 of carrier fluid 12 comprising drops 4 form and fall into a same compartment 90.

The experiment consists of counting the number of successive pockets 8 that fall and measuring the recovered mass. The critical fragmentation volume is next calculated from the number of pockets counted, the recovered mass and the density of the carrier fluid 12 and the internal fluid 14.

For example, the fall of ten successive pockets is counted and the obtained mass is measured. The critical fragmentation volume is obtained from this mass divided by 10.

In one example, the density of the internal fluid is at least two times smaller than the density of the carrier fluid 12. The critical fragmentation volume is calculated from the number of pockets 8 counted, the recovered mass and the density of the carrier fluid 12 only.

In a variant, the control unit 42 is able to calculate the critical fragmentation volume as a function of the shape of the tube 74, and the nature of the carrier fluid 12.

In one example, the critical fragmentation volume Vc is calculated from the Bond Number.

The Bond Number (Bo) is written:

$$Bo = \frac{\Delta\rho * g * d^2}{\sigma}$$

Where

- $\Delta\rho$ is the difference between the density of the carrier fluid 12 and the density of the air surrounding the tube 74 at the outlet,
- g is the gravitational acceleration,
- d is the diameter of a pocket 8 at the outlet,
- $\sigma$ is the surface tension between the carrier fluid 12 and the air surrounding the tube 74 at the outlet.

When the Bond number is greater than or equal to 1, there is fragmentation. The critical fragmentation diameter $d_F$ is calculated from the equation below:

$$Bo(d_F) = \frac{\Delta\rho * g * d_F^2}{\sigma} = 1$$

The fragmentation volume is next calculated as being the volume of a sphere with diameter $d_F$.

The control unit 42 has at least one critical separation volume in memory.

The critical separation volume is adapted to the system, in particular to the movement speed of the displacement device 40, so that each of the pockets 8 separated by a separator 10 having a volume greater than or equal to the critical separation volume is recovered in a different compartment 90.

The critical separation volume for example has been determined beforehand for a first recovery system 1 with the same carrier fluid 12 and the same separator fluid 20, with the same type of recovery substrate 38 by performing calibration experiments, for a constant movement speed. A calibration experiment is described later.

In a variant, the control unit 42 is able to calculate the critical separation volume as a function of the shape of the tube 74, the shape of the nozzle 44, the recovery substrate 36, the flow rate of the working fluid 6 and the flow rate of the air flow of the blower unit 46, the movement speed of the recovery substrate 36.

In a variant, the critical separation volume is set manually, during the circulation of the pockets 8 in the conduit 30.

The control unit 42 has at least one critical detachment volume $V_D$ in memory.

The critical detachment volume $V_D$ is adapted to the system so that 100% of the bubbles have a volume greater than or equal to the detachment volume $V_D$, detach at the outlet 54.

The critical detachment volume $V_D$ for example has been determined beforehand for a first recovery system 1 with the same carrier fluid 12 and the same separator fluid 20, by performing calibration experiments.

A calibration example making it possible to determine the critical separation volumes will now be described.

The experiments have been done for a working fluid 8 comprising liquid drops 4 having a strong adhesion to the PTFE tube 74.

In the example, the operational speed of the displacement device is 11 mm/s and the distance between the detection zone and the outlet is 2 cm.

The circulation flow rates of the working fluid 6 and the air flow are adjusted manually to reach a drop ejection frequency 4 that is adapted to the operational speed of the displacement device and to the distance between the detection area of the drops and the ejection area in the displacement device.

Then, the volume of carrier fluid 12 in the pockets 8 is adjusted to measure 1 time to 1.5 times the volume of a drop 4.

The blowing pressure is adjusted until obtaining an optimal bubble ejection.

The verification of single bubble ejections surrounded by a film formed by the pocket 8 of carrier fluid 12 and comprising a drop 4 and the correct number of drop 4 pockets 8 received per compartment is done by high-speed imaging.

Pockets 8 of different volumes are generated and the verification of the ejection of the pockets 8 is done. When they arrive at the outlet 54, the pockets 8 can have different behaviors.

When a pocket 8 remains fully attached at the outlet 54, the control unit 42 stores that the critical detachment volume must be greater than the volume of this pocket 8.

The pocket 8 next forms a bubble that inflates owing to the arrival of part of the separator 10. When the bubble detaches, its volume is equal to the critical detachment volume.

The diameter db of the bubble at the moment of the detachment is strictly greater than the outer diameter of the tube 74.

The critical detachment volume of the bubble is such that the air flow sent by the blower unit 46 is able to exert a force on the surface of the bubble sufficient to exceed the contact forces between the bubble and the tube 74 and allow its loosening.

In a variant, the control unit 42 is able to calculate the critical detachment volume $V_D$ as a function of the shape of the tube 74, the shape of the nozzle 44, the flow rate of the working fluid 6 and the flow rate of the air flow of the blower unit 46.

For example, the critical detachment volume $V_D$ is determined owing to the Weber number.

Furthermore, the control unit 42 is able to measure the size of a separator 10 from data from the sensor 48. The control unit 42 is able to determine an additional volume of separator fluid for a separator 10 as a function of the deviation between the volume of the separator 10 and the critical separation volume. The control unit 42 is able to control the separator fluid injection device 82 so that it injects, into the separator fluid injection area 66, the determined additional volume of separator fluid 20.

Furthermore, the control unit 42 is able to measure the size of a pocket 8 from data from the sensor 48. The control unit 42 is able to determine an additional volume of carrier fluid 12 for a pocket 8 as a function of the deviation between the volume of the pocket 8 and the volume of the separator 10 that follows it and the critical detachment volume.

The control unit 42 is able to control the carrier fluid injection device 80 so that it injects, into the carrier fluid injection area 64, the determined additional volume of separator carrier 12.

The control unit 42 is able to control the flow rates of the working fluid 6 within the circulation conduit 30.

For example, the control unit 42 imposes a fixed flow rate for the working fluid 6 in the circulation conduit 30 by controlling the circulation device 34.

Furthermore, the control unit 42 is able to vary the flow rate of the separator fluid injection device 20 and the flow rate of the carrier fluid injection device 12.

The control unit 42 is able to control the movement of the substrate 38.

Advantageously, the control unit 42 is able to control the displacement device 40 as a function of the volumes of the pockets 8 and separators 10 in the outlet zone 60 so that a single pocket 8 comprising a drop is recovered in each compartment 90 of the substrate 38.

In a variant or additionally, the control unit 42 commands the displacement device 40 according to a specific sequence independently of the detection of the pockets 8 and drops 4.

In a variant or additionally, the control unit 42 commands the displacement device 40 as a function of signals detected by the outlet detector 50. For example, the detection of drops 4 or pockets 8 by the outlet detector 50 makes it possible to trigger the movement of the displacement device 40. After each recovery, the displacement device 40 is able to place the outlet 54 opposite a different compartment 90 after each displacement of the substrate 38.

The nozzle 44 is extended in the longitudinal direction X around the tube 74 in the outlet zone 60 of the circulation conduit 30. The nozzle 44 has a through passage 94 in which a portion of the tube 74 is arranged.

The nozzle 44 is for example a glass tube.

The nozzle 44 comprises an upper portion 96 and a lower portion 98. The through passage 94 is extended along the longitudinal direction X and emerges in the lower portion 98 by an orifice delimited by a neck 100.

The diameter of the orifice delimited by the neck 100 of the nozzle 44 is slightly larger than the outer diameter of the tube 74 in the outlet area 60. The inner diameter of the upper portion 96 is larger than the outer diameter of the tube 74 in the outlet area 60.

The lower portion 98 for example has a frustoconical or curved section. The lower portion 98 of the nozzle 44 advantageously has a shape beveled at 45°.

The tube 74 is placed in the through passage 94 of the nozzle 44 such that the tube 74 protrudes outside the nozzle 44. The mouth 76 is outside the nozzle 44.

For example, the mouth 76 of the tube 74 is at a distance from the neck 100 of the nozzle 44 of between 1 mm and 10 mm.

The outer wall 75 of the tube 74 bears on the neck 100 of the nozzle at the outlet of the through passage.

Figure 5:
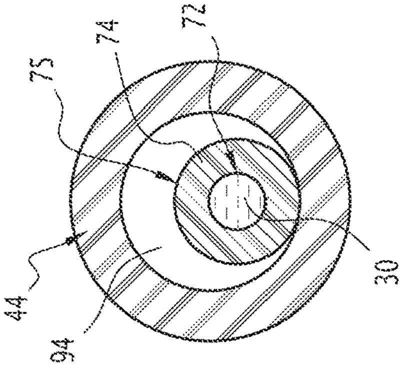
FIGS. 5 to 7 are sectional illustrations along plane V of FIG. 3 according to different variants.
Figure 6:
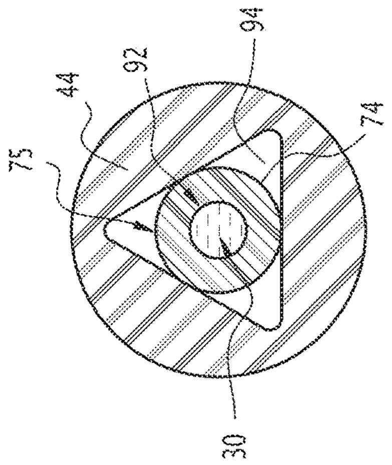
Figure 7:
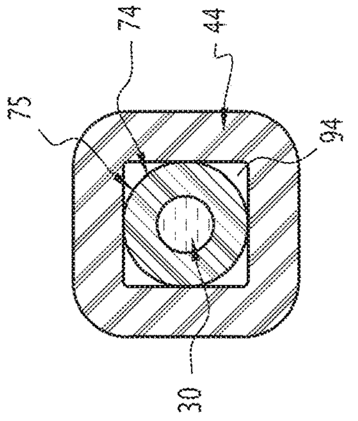

FIGS. 5 to 7 show different possible sections of the nozzle 44 and the tube 74 at the outlet, at their free ends.

In the first variant shown in FIG. 5, the tube 74 and the nozzle 44 have a circular section.

Advantageously, the tube 74 and the nozzle 44 are centered and share the same axis of symmetry. Exemplary tube 74 and nozzle 44 embodiments having the same axis of symmetry are shown in FIG. 6 and FIG. 7.

In the variant of FIG. 6, the through passage 94 of the nozzle 44 has a polygonal cross-section, here an equilateral triangle. The outer wall 75 of the tube 74 fits in the polygon.

In the variant of FIG. 7, the through passage 94 of the nozzle 44 has a square cross-section The outer wall 75 of the tube 74 fits in the square.

In a variant, the nozzle 44 is [sic] comprises fins making it possible to adjust the centering and the symmetry of the tube 74 relative to the nozzle 44.

The blower unit 46 is able to inject a flow of air into the through passage 94 such that a part of the air runs along the outer wall 75 of the tube 74, up to the mouth 76 of the tube 74.

For example, the blower unit 46 includes an injection tube 3 m long and with an inner diameter of 750 μm, and the injection pressure at the inlet of the injection tube is between 400 mBar and 1000 mBar.

The control unit 42 is able to control the blower unit 46 such that it injects air into the through passage 94 at a flow rate of between 100 μL/h and 1000 mL/h and advantageously a flow rate of 300 mL/h.

When the compartments 90 of the substrate 38 are filled with a liquid, the injection pressure at the inlet of the injection tube is advantageously kept below 500 mBar.

The sensor 48 is able to detect the volume of the successive pockets in the measuring region 62. Furthermore, the sensor 48 is able to detect the volume of the successive separators in the measuring region 62.

Advantageously, the sensor 48 is also able to take a measurement within the drop 6 contained in the pocket 8.

For example, the measurement is an optical measurement, such as a fluorescence measurement.

The outlet detector 50 is able to detect the passage of the pockets 8 at in [sic] the outlet zone 60. The outlet detector 50 is able to detect the passage of the separators 10 at in [sic] the outlet zone 60.

Advantageously, the outlet detector 50 is also able to take a measurement within the drop 6 contained in the pocket 8.

A drop recovery method according to the invention will now be described.

The first drop recovery system 1 is provided.

The circulation device 34 for the working fluid is supplied with a working fluid 6 as previously described.

The working fluid 6 is injected into the inlet zone 56 of the circulation conduit 30 using the circulation device 34 for the working fluid.

The pockets 8 and the separators 10 for the working fluid 6 are sequenced along the circulation conduit 30. Two successive pockets 8 are separated by a separator 10. Two successive separators 10 are separated by a pocket 8.

The working fluid 6 is for example circulated at a flow rate of 2 mlih.

Advantageously, the circulation speed of the pockets 8 in the circulation conduit 30 is less than the maximum movement speed of the displacement device 40.

The working fluid 6 is conveyed in the circulation conduit 30 toward the outlet 54.

The pockets 8, comprising the drops 4, and the separator 10 successively enter, one by one, in the preparation area 58 of the circulation conduit 30.

The pockets 8 and the separators 10 of the working fluid 6 pass one by one in the measuring region 62.

A step for detecting the passage of successive pockets 8 in the measuring region 62 is implemented by the sensor 48.

The sensor 48 measures information relative to the pocket 8 such as its volume or its diameter. Furthermore, the sensor 48 advantageously measures information relative to the drop 4 contained in the pocket 8. For example, the measurement is a fluorescence measurement representative of the specific element 18 of the drop 4. The collected information is for example an enzymatic activity, a number of cells, a biomass or a quantity of protein produced in the drop 4.

The control unit 42 calculates the additional volume of carrier fluid 12 to be added so that the volume of a bubble formed from the pocket 8 is greater than or equal to the critical detachment volume.

Advantageously, the control unit 42 calculates the additional volume of carrier fluid 12 to be added so that the volume of a bubble formed from the pocket 8 is equal to the critical detachment volume.

The control unit 42 stores the number of the pocket and the measured information in order.

A step for detecting the passage of successive separators 10 in the measuring region is implemented by the sensor 48.

The sensor 48 measures information relative to the separator such as its volume or its diameter.

The control unit 42 calculates the additional volume of separator fluid 20 to be added so that the volume of the separator 10 is greater than or equal to the critical separation volume and so that the volume of a bubble formed from a part of the separator 10 is greater than or equal to the critical detachment volume.

Advantageously, the control unit 42 calculates the additional volume of separator fluid to be added so that the volume of the separator 10 is equal to the critical separation volume.

The control unit 42 stores the number of the separator 10 and the measured information in order.

For each pocket 8, the control unit 42 triggers the injection of carrier fluid 12, by the control [of] the carrier fluid injection device 80, such that the stored additional volume of carrier fluid 12 is injected in the preparation area, during the passage of said pocket 8.

Advantageously, the injection rate of the carrier fluid 12 by the carrier fluid injection device 80 is adjusted in real time by the control unit 42.

The additional volume of carrier fluid 12 is injected in each pocket 8 when it arrives at the carrier fluid injection zone 68.

After the injection of carrier fluid 12 in a pocket 8, the sum of the volume of the pocket 8 and the separator 10 that follows it is greater than or equal to the critical detachment volume.

Furthermore, advantageously, after the injection of carrier fluid 12 in a pocket 8, the volume of the pocket 8 is strictly smaller than the critical fragmentation volume.

For example, the volume of carrier fluid 12 in a pocket 8 after the injection of additional carrier fluid 12 is between 300 nL and 500 nL.

Advantageously, the volume of the pocket 8 after the injection of the additional volume of carrier fluid 12 is between 100% and 300% of the volume of the pocket 8 before it enters the preparation area 58.

In one example, the volume of the drop 4 is between 200 nL and 300 nL and the volume of carrier fluid 12 in a pocket 8 in the inlet zone 56 is between 50 nL and 150 nL. The volume of carrier fluid 12 in the pocket 8 is between 300 nL and 500 nL downstream from the carrier fluid injection area 64. The increased volume of carrier fluid 12 additionally makes it possible to lubricate the drop 4 and to space the drop 4 further away from the separators 10 adjacent to the pocket 8.

For each separator 10, the control unit 42 triggers the injection of separator fluid 20 by the separator fluid injection device 82, such that the stored additional volume of separator fluid 20 is injected in the preparation area 58, during the passage of said separator 10.

Advantageously, the injection rate of the separator fluid 20 by the separator fluid injection device 82 is adjusted in real time by the control unit 42.

The additional separator fluid 20 is injected in each separator 10 when the separator 10 arrives at the separator fluid injection zone 66.

After the injection of separator fluid 20 in a separator 10, the volume of the separator 10 is greater than a critical separation volume. Furthermore, the sum of the volume of the pocket 8 that precedes the separator 10 that follows it is greater than or equal to the critical detachment volume.

The diameter of the separator 10 is the distance between two successive pockets 8.

The critical separation volume is such that the distance between two successive pockets 8 in the conduit 30 is between 5 mm and 50 mm.

For example, the volume of the separator 10 after the injection of additional separator fluid 20 is such that the distance between two successive pockets 8 in the conduit 30 is between 10 mm and 30 mm.

In one example, the volume of the separator 10 after the injection of additional separator fluid 20 is 10 to 30 times greater than the volume of the separator 10 before the injection of additional separator fluid 20.

Advantageously, the diameter of the separator 10 after the injection of the additional volume of separator fluid 20 is between 50% and 3000% of the diameter of the separator 10 before it enters the preparation area 58.

The diameter of the separator 10 in the outlet zone 60 is such that the pockets 8 separated by the separator 10 are spaced apart enough for the displacement device 40 to be able to move the outlet 54 of the conduit 30 opposite two compartments 90 between two successive intakes of the pockets 8 at the outlet 54.

Preferably, the volume of the separator 10 after the injection of additional separator fluid 20 is between 1000% and 3000% of the critical separation volume.

After the preparation area 58, the pockets 8 comprising the drops 4 and the separators 6 successively enter, one by one, in the outlet area 60 of the circulation conduit 30.

Advantageously, each pocket 8 and each separator 10 is detected by the outlet detector. In a variant, the drops 4 in the pockets 8 are detected by the outlet detector 50.

Air is injected into the through passage 94 of the nozzle 44 by the blower unit 46. The air flow rate and the flow rate of the pockets 8 are adjusted by the control unit 42 so that each pocket 8 successively detaches from the mouth of the tube. The injected air makes it possible to facilitate the loosening of the pockets 8.

The air [is] advantageously injected by the blower unit 46 with continuous flow in the through passage.

The pockets 8 and the separators 10 arrive successively at the outlet 54.

A pocket 8 comprising a drop 4 having a volume smaller than the fragmentation volume and smaller than the detachment volume does not fall before the arrival of the separator 10 that follows it.

The carrier fluid 12 of the pocket 8 adheres to the outer wall 75 of the tube 74 at the outlet 54. Part of the separator 10 arriving after the pocket 8 gradually inflates the pocket 8 so as to form a bubble, as shown in FIG. 4. The bubble adheres to the outlet 54 of the tube 74 using the carrier fluid 12 as long as the volume is strictly below the critical detachment volume.

When the bubble reaches the critical detachment volume, it detaches from the outlet 54, the rest of the separator 10 remaining in the circulation conduit 30.

Next, the pocket 8 comprising a drop 4 is recovered in a compartment 90 of the substrate 38. The pocket 8 is recovered in the compartment 90 placed opposite the outlet 54.

The control unit 42 triggers the movement of the displacement device 40 as a function of the volume of the separators 10. Thus, each pocket 8 is recovered in a different compartment 90 of the substrate 38.

The passage time between two successive pockets 8 in front of a point of the outlet is at least equal to the relative movement time of the outlet 54 between the two compartments 90.

Advantageously, the movement speed of the displacement device 40 is constant and each separator 10 has, in the outlet area 60, a volume adapted to this speed so that a new compartment 90 is placed in front of the outlet 54 when the outlet 54 of each pocket 8 arrives.

In a variant, the control unit 42 triggers the movement of the displacement device as a function of the volume of the separators and/or measurements by the outlet detector.

Thus, each pocket 8 is recovered in a different compartment 90 of the substrate 38.

Each drop 4 is traced by the control unit 42. For example, the drops 4 are detected at the sensor 48 and are numbered. Each drop 4 is thus associated both with a measurement and with the compartment 90 in which it was recovered.

Figure 8:
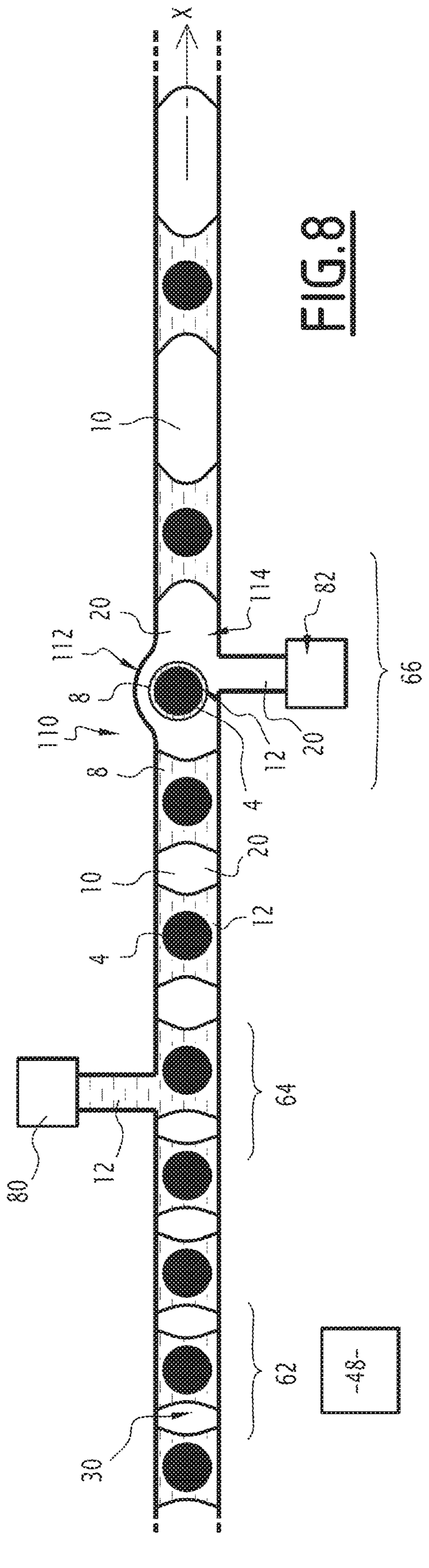
FIG. 8 is a schematic illustration of part of a second drop recovery system according to the invention.

A second recovery system 110 is described in light of FIG. 8. The second recovery system 110 differs from the first recovery system 1 in that in the preparation area 58, the conduit 30 has a wider area 112.

In the wider area 112, the diameter of the conduit 30 gradually increases, then gradually decreases in the circulation direction of the fluids. The conduit 30 forms a bladder protruding laterally in the wider area 112.

The injection area for the separator fluid 64 is placed in the wider area 112. Preferably, the injection conduit for the separator fluid emerges where the diameter of the conduit is maximal.

The shape of the wall 72 of the conduit 30 in the wider area 112 is suitable for facilitating the injection of the separator fluid.

The maximum diameter of the conduit 30 in the wider area 112 is for example increased by 60% relative to the diameter of the conduit 30 in the inlet area 56.

The maximum diameter of the conduit 30 in the wider area 112 is for example equal to 150% of the average diameter of the drops 4. "Average diameter" means the diameter of a drop 4 when it is not confined by the wall 72 of the circulation conduit 30.

The diameter of the conduit 30 upstream from the wider area 112 is advantageously equal to the diameter of the conduit downstream from the wider area 112.

The drop recovery method with the second recovery system 100 differs from the method previously described in that during the preparation for the distribution of the pockets, the pocket and the two separators that surround it pass through the wider area.

Indeed, due to the larger available volume, the pocket 8 assumes a substantially spherical shape and the two separators 10 that frame the pocket in the conduit merge and form a layer 114 of separator fluid all the way around the pocket 8.

Thus, during the injection of separator fluid 20, the additional volume is added all the way around the pocket 8.

After passage in the wider area 112, the pocket and the layer are confined again. Two separators 10 reform around the pocket 8 and have the desired volume.

Thus, the additional volume of separator fluid 20 is added in the two separators 10 surrounding the pocket 8 at the same time.

Such a system makes the preparation easier.

Figure 9:
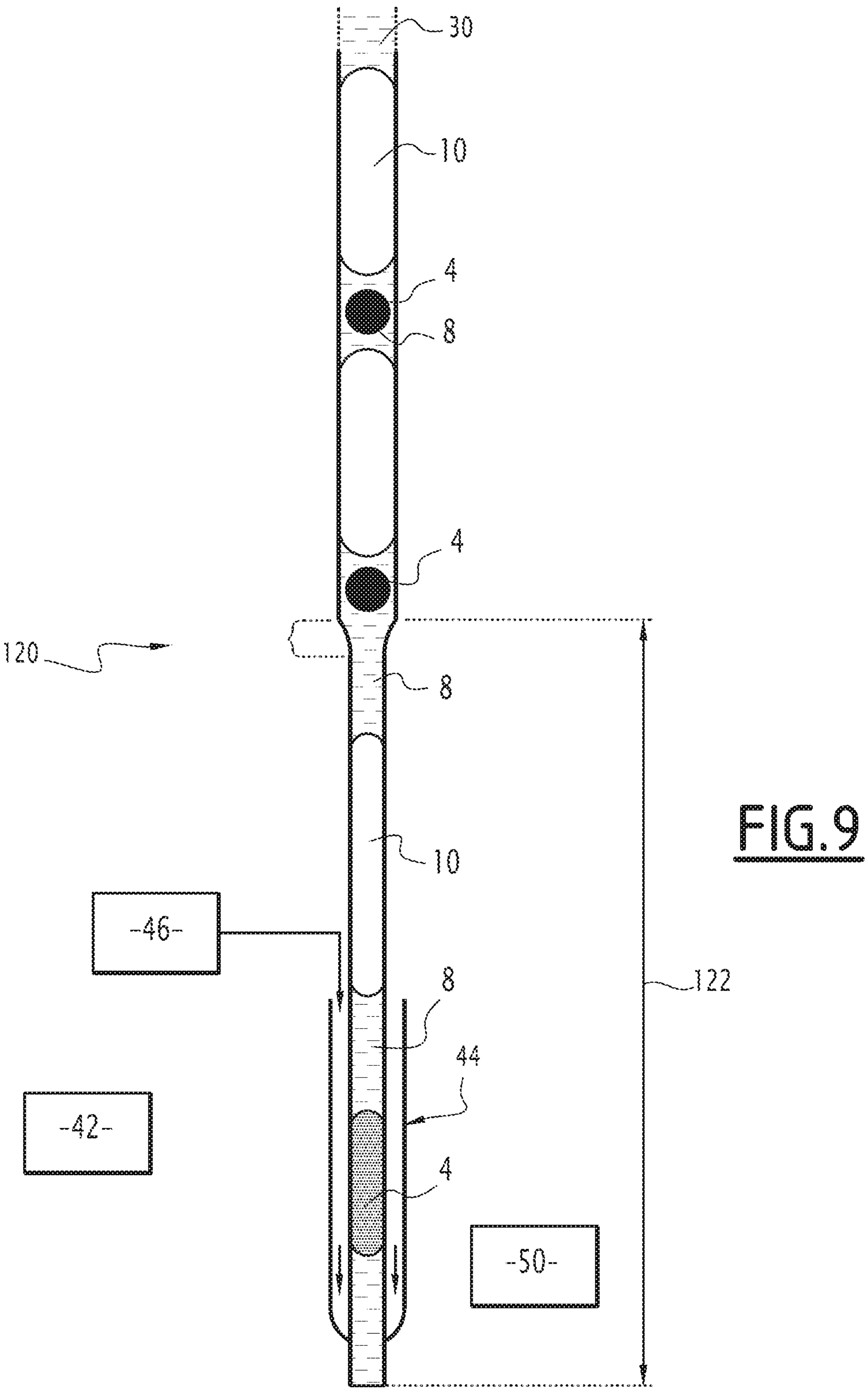
FIG. 9 is a detailed illustration of part of a third recovery system.

A third recovery system 120 will be described in light of FIG. 9. The third recovery system 120 differs from the first recovery system and the second recovery system 110 in that in the outlet area 60, the conduit 30 has a narrower area 122.

The narrower area 122 extends to the outlet 54 of the circulation conduit 30.

For example, the outer diameter of the tube 74 in the narrower area 122 is smaller than the inner diameter of the tube 74 in the inlet area 56.

In one example, the tube 74 has, in the inlet area 56, and in the preparation area 58, an outer diameter of 1.6 mm and an inner diameter of 0.75 mm, and the tube 74 has, in the narrower area 122, an outer diameter of 0.75 mm and an inner diameter of 0.3 mm.

These geometric elements are known and stored by the control unit 42. The critical detachment, fragmentation and separation volumes are, for example, determined as a function of these parameters.

In one example, the conduit 30 has, in the inlet area, an incubation area. The tube 74 is placed under controlled temperature conditions in the incubation area. The incubation area advantageously has a sufficient length along the longitudinal axis X for bacteria within a drop 4 of a pocket 8 to be able to multiply.

Each pocket 8 advantageously comprises only one drop 4. In a variant, some pockets 8 do not contain drops 4. In a variant, some pockets 8 initially comprise a plurality of drops 4, the drops 4 coalesce to form a single drop 4 within the pocket 8.

In a variant, a part of the circulation conduit 30 is defined in a chip, the outlet zone 60 of the circulation conduit 30 being defined in a tube 74. The chip is made from a material not permeable to the carrier fluid 12 and advantageously to the separator fluid 20. The chip is, for example, a rectangular block extending along the longitudinal axis X and a transverse axis perpendicular to the longitudinal axis X. In a variant, the diameter of a drop 4 is smaller than the inner diameter of the circulation conduit 30.

The invention described above provides the user with a more reliable and precise drop recovery system 1, 110, 120 than the existing systems, allowing an effective recovery of each drop 4 and limiting the contamination risks.

Indeed, the preparation of the working fluid 6 for distribution prevents a pocket 8 from remaining stuck to the mouth 76 until the arrival of the following pocket 8, since it forms a bubble having a volume greater than or equal to a critical detachment volume, and prevents the pockets 8 from being distributed outside compartments 90 or several from being distributed in the same compartment 90, since the separators 10 have a volume greater than or equal to a critical separation volume.

Thus, even if the drops 4 are not spaced regularly apart in the working fluid 6, the expulsion from the conduit 30 is controlled by the inflation of the bubbles until detachment. This prevents a drop 4 from staying on the mouth 76 and contaminating the following drop 4.

The recovery system 1, 110, 120 further allows easy and quick implementation of the recovery method.

The invention claimed is:

1. A drop recovery system comprising:

a circulation conduit for the circulation of a working fluid, the circulation conduit comprising an outlet, a device for introducing and circulating a working fluid into the circulation conduit, the working fluid comprising a plurality of pockets, each pocket comprising a carrier fluid and a pocket containing a drop of internal fluid, the internal fluid being immiscible with the carrier fluid, each pocket being isolated from the following pocket by a separator, each separator being made up of a separator fluid that is immiscible with the carrier fluid, a recovery substrate for receiving the pockets of the working fluid, the recovery substrate comprising several compartments, a compartment being placed opposite the outlet of the circulation conduit, a relative displacement device for moving the substrate with respect to the circulation conduit, the displacement device configured to successively place the outlet of the circulation conduit opposite at least two different compartments of the substrate, and wherein the recovery system further comprises:

a preparation device connected to the circulation conduit at a location downstream of the device for introducing and circulating a working fluid, the preparation device receiving the working fluid having said plurality of pockets and said separator fluid therein and being configured to inject, into the circulation conduit, an additional volume of separator fluid and an additional volume of carrier fluid, such that the volume of at least one separator is greater than or equal to a critical separation volume, and such that the volume of at least one bubble formed by a pocket and at least a part of said separator is greater than or equal to a critical detachment volume, a tube defining a part of the circulation conduit for the working fluid, the tube emerging on an open mouth at the outlet of the circulation conduit, the tube comprising an outer wall, and a nozzle having a through passage, the tube being placed in the through passage of the nozzle, wherein the circulation conduit is substantially vertical at the outlet.

2. The drop recovery system according to claim 1, comprising:

a blower unit able to inject a flow of air into the through passage such that a part of the air runs along the outer wall of the tube up to the mouth of the tube.

3. The drop recovery system according to claim 2, wherein the blower unit is able to inject a continuous flow of air into the through passage.

4. The drop recovery system according to claim 2, wherein the tube and the nozzle have a same axis of symmetry and the tube is centered relative to the nozzle.

5. The drop recovery system according to claim 2, wherein the inner passage has a polygonal shape, the outer wall of the tube being fitted in the polygon.

6. The drop recovery system according to claim 1, comprising a control unit able to control the quantity of separator fluid and/or carrier fluid injected into the circulation conduit by the preparation device for the distribution of the pockets.

7. The drop recovery system according to claim 1, wherein the circulation conduit has a wider area, the preparation device for the distribution of the pockets being able to inject the additional volume of separator fluid into the wider area.

8. The drop recovery system according to claim 1, wherein the circulation conduit has an injection area for the carrier fluid and an injection area for the separator fluid located downstream from the injection area for the carrier fluid.

9. The drop recovery system according to claim 1, wherein the separator fluid is a gas.

10. The drop recovery system according to claim 1, wherein the preparation device for the distribution of the pockets is able to inject, into the circulation conduit, an additional volume of carrier fluid, such that the volume of at least one pocket is strictly less than a critical fragmentation volume.

11. A drop recovery method comprising the following steps:

introducing and circulating a working fluid into a circulation conduit comprising an outlet, the working fluid comprising a plurality of pockets, each pocket comprising a carrier fluid and a pocket containing a drop of internal fluid, the internal fluid being immiscible with the carrier fluid, each pocket being isolated from the following pocket by a separator, each separator being made up of a separator fluid that is immiscible with the carrier fluid, recovering at least one pocket, in at least one compartment of a recovery substrate including several compartments, said compartment being placed opposite the outlet of the circulation conduit, the relative displacement of the substrate with respect to the circulation conduit, so as to successively place the outlet of the conduit opposite at least two different compartments of the substrate, wherein the circulation conduit comprises a tube defining a part thereof for the working fluid, the tube emerging on an open mouth at the outlet of the circulation conduit, the tube comprising an outer wall;

the tube is placed in a through passage of a nozzle, and the circulation conduit is substantially vertical at the outlet, and wherein the method further comprises:

the preparation of the distribution of the pockets comprising:

a preparation device connected to the circulation conduit for receiving the working fluid having said plurality of pockets and said separator fluid therein, said preparation device injecting into the circulation conduit an additional volume of separator fluid, and injecting into the circulation conduit an additional volume of carrier fluid, the preparation of the distribution of the pockets being such that the volume of at least one separator is greater than or equal to a critical separation volume and the volume of at least one bubble formed by a pocket and a part of said separator is greater than or equal to a critical detachment volume.

12. The drop recovery method according to claim 11, wherein the circulation conduit is defined by a wall and the recovery comprises:

the discharge at the outlet of the circulation conduit of a pocket and part of the separator, said pocket and said part of the separator forming a bubble having a volume greater than or equal to the critical detachment volume, the pocket detaching from the wall of the circulation conduit, and moving into the compartment of the substrate located opposite the outlet.

13. The drop recovery method according to claim 11, comprising:

the discharge through the outlet of the circulation conduit of a separator having a volume greater than or equal to the critical separation volume, during the movement of the substrate relative to the distribution conduit between a first compartment and a second compartment, such that the pocket following the separator arrives at the outlet of the circulation conduit, when the outlet of the conduit is opposite the second compartment.

14. The drop recovery method according to claim 11, wherein the separation volume is determined on the basis of the movement speed of the displacement device, the distance between two different compartments of the substrate and the flow rate of the working fluid in the circulation conduit.

* * * * *